US012720449B2

(12) United States Patent
Miao et al.

(10) Patent No.: US 12,720,449 B2
(45) **Date of Patent: *Aug. 25, 2026**

(54) METHODS, DEVICES AND COMPUTER STORAGE MEDIA FOR COMMUNICATION

(71) Applicant: NEC CORPORATION, Tokyo (JP)

(72) Inventors: Zhaobang Miao, Beijing (CN); Shichang Zhang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 536 days.

This patent is subject to a terminal disclaimer.

(21) Appl. No.: 17/763,994

(22) PCT Filed: Sep. 27, 2019

(86) PCT No.: PCT/CN2019/108635

§ 371 (c)(1),
(2) Date: Mar. 25, 2022

(87) PCT Pub. No.: WO2021/056443

PCT Pub. Date: Apr. 1, 2021

(65) Prior Publication Data

US 2022/0346038 A1 Oct. 27, 2022

(51) Int. Cl.

*H04W 52/38* (2009.01)
*H04B 17/318* (2015.01)
*H04W 52/24* (2009.01)

(52) U.S. Cl.

CPC ........ *H04W 52/383* (2013.01); *H04B 17/328* (2023.05); *H04W 52/242* (2013.01); *H04W 52/245* (2013.01)

(58) Field of Classification Search

CPC ............. H04W 52/245; H04W 52/242; H04W 52/383

See application file for complete search history.

(56) References Cited

U.S. PATENT DOCUMENTS

2018/0076984 A1 3/2018 Yang et al.
2019/0149253 A1 5/2019 Yoon et al.
(Continued)

FOREIGN PATENT DOCUMENTS

EP 3917225 A1 12/2021
JP 2022-525587 A 5/2022
(Continued)

OTHER PUBLICATIONS

Office Action issued Nov. 2, 2022 in Indian Application No. 202217024712.
(Continued)

*Primary Examiner* — Dai Phuong
(74) *Attorney, Agent, or Firm* — Sughrue Mion, PLLC

(57) ABSTRACT

Embodiments of the present disclosure relate to methods, devices and computer readable media for communication. A method comprises determining, at a first terminal device, a time window during which a second terminal device is to filter Sidelink Reference Signal Received Power (SL-RSRP) of sidelink transmissions received from the first terminal device; receiving, from the second terminal device, the filtered SL-RSRP during the time window; estimating a sidelink path loss based on the filtered SL-RSRP; and applying the sidelink path loss to power control of at least one subsequent sidelink transmission from the first terminal device to the second terminal device. In this way, the SL path loss can be estimated more accurately and reasonably, and thus the power control based on the SL path loss can be performed more effectively.

6 Claims, 6 Drawing Sheets

(56) References Cited

U.S. PATENT DOCUMENTS

| | | | | |
|---|---|---|---|---|
| 2021/0410076 | A1 * | 12/2021 | Ryu | H04W 52/146 |
| 2022/0007302 | A1 * | 1/2022 | Lin | H04W 52/383 |
| 2022/0338129 | A1 * | 10/2022 | Sun | H04W 76/40 |
| 2023/0079660 | A1 * | 3/2023 | Fu | H04L 5/0044<br>370/329 |
| 2025/0063513 | A1 * | 2/2025 | Ryu | H04W 52/245 |

FOREIGN PATENT DOCUMENTS

| | | | |
|---|---|---|---|
| WO | 2016/163834 | A1 | 10/2016 |
| WO | 2018/203669 | A1 | 11/2018 |
| WO | 2019/178749 | A1 | 9/2019 |

OTHER PUBLICATIONS

Extended European Search Report issued Sep. 20, 2022 in European Application No. 19946565.9.

"Physical Layer Procedures for NR V2X Sidelink Design", Intel Corporation, 3GPP TSG RAN WG1 RAN1#96, R1-1903450 (revision of R1-1902482), Feb. 25-Mar. 1, 2019, Athens, Greece (14 pages total).

"Discussion on physical layer procedures for NR sidelink", LG Electronics, 3GPP TSG RAN WG1 Meeting #96bis, R1-1905443, Apr. 8-12, 2019, Xi'an, China (12 pages total).

"Discussion on physical layer procedures for sidelink", Spreadtrum Communications, R1-1906362, 3GPP TSG RAN WG1 #97, May 13-17, 2019, 8 pages, Reno, USA.

International Search Report for PCT/CN2019/108635 dated Jun. 23, 2020 (PCT/ISA/210).

Written Opinion for PCT/CN2019/108635 dated Jun. 23, 2020 (PCT/ISA/237).

Japanese Office Action issued May 30, 2023, in Application No. 2022-519367.

"Discussion on physical layer procedures for NR sidelink," LG Electronics, 3GPP TSG RAN WG1 Meeting #98, Aug. 26-30, 2019, R1-1908906, pp. 1-19 (19 pages total).

"Consideration on sidelink RRM measurement", ZTE Corporation, Sanechips, 3GPP TSG RAN WG2 Meeting #106, R2-1906479, May 13-17, 2019, (3 pages).

Communication dated Apr. 10, 2024 in European Office Action dated 19 946 565.9.

Notification of Reasons for Refusal dated Apr. 23, 2024 in Japanese Application No. 2023-107023.

* cited by examiner

METHODS, DEVICES AND COMPUTER STORAGE MEDIA FOR COMMUNICATION

CROSS REFERENCE TO RELATED APPLICATIONS

This application is a National Stage of International Application No. PCT/CN2019/108635 filed Sep. 27, 2019.

TECHNICAL FIELD

Embodiments of the present disclosure generally relate to the field of telecommunication, and in particular, to methods, devices and computer storage media for communication.

BACKGROUND

Device to device (D2D) communications are enabled in 5G New Radio (NR). In D2D communications, two terminal devices can communicate with each other via a D2D communication link, which is also referred to as a sidelink (SL). In order to perform SL open-loop power control, one terminal device acting as a transmitting (TX) device may transmit reference signals (RSs) for sidelink Reference Signal Received Power (SL-RSRP) measurement to the other terminal device acting as a receiving (RX) device. The RX device may measure SL-RSRP of the RSs received from the TX device. For example, the RX device may filter the measured SL-RSRP and report the filtered SL-RSRP to the TX device. Then, the TX device can derive a path loss of the SL based on the filtered SL-RSRP.

In 3GPP discussions, it has been proposed that the transmit power of the RSs will not be indicated to the RX device. However, the actual transmit power of the TX device may vary among SL-RSRP measurement occasions due to various reasons (such as, downlink based power control, power sharing between the sidelink and a simultaneous uplink or between different sidelinks, and so on). Without information about the transmit power of the TX device, the filtered SL-RSRP derived at the RX device may be inaccurate and thus the SL path loss estimated based on the filtered SL-RSRP may also be inaccurate.

SUMMARY

In general, example embodiments of the present disclosure provide methods, devices and computer storage media for communication.

In a first aspect, there is provided a method of communication. The method comprises: determining, at a first terminal device, a time window during which a second terminal device is to filter Sidelink Reference Signal Received Power (SL-RSRP) of sidelink transmissions received from the first terminal device; receiving, from the second terminal device, the filtered SL-RSRP during the time window; estimating a sidelink path loss based on the filtered SL-RSRP; and applying the sidelink path loss to power control of at least one subsequent sidelink transmission from the first terminal device to the second terminal device.

In a second aspect, there is provided a method of communication. The method comprises: determining, at a second terminal device, a time window during which the second terminal device is to filter Sidelink Reference Signal Received Power (SL-RSRP) of sidelink transmissions received from a first terminal device; measuring the SL-RSRP of the sidelink transmissions received from the first terminal device during the time window; filtering the SL-RSRP during the time window; and transmitting the filtered SL-RSRP to the first terminal device, such that the first terminal device performs power control of at least one subsequent sidelink transmission from the first terminal device to the second terminal device based on the filtered SL-RSRP.

In a third aspect, there is provided a first terminal device. The first terminal device comprises a processor and a memory coupled to the processor. The memory stores instructions that when executed by the processor, cause the first terminal device to perform the method according to the first aspect of the present disclosure.

In a fourth aspect, there is provided a second terminal device. The second terminal device comprises a processor and a memory coupled to the processor. The memory stores instructions that when executed by the processor, cause the second terminal device to perform the method according to the second aspect of the present disclosure.

In a fifth aspect, there is provided a computer readable medium having instructions stored thereon. The instructions, when executed on at least one processor, cause the at least one processor to perform the method according to the first of the present disclosure.

In a sixth aspect, there is provided a computer readable medium having instructions stored thereon. The instructions, when executed on at least one processor, cause the at least one processor to perform the method according to the second of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
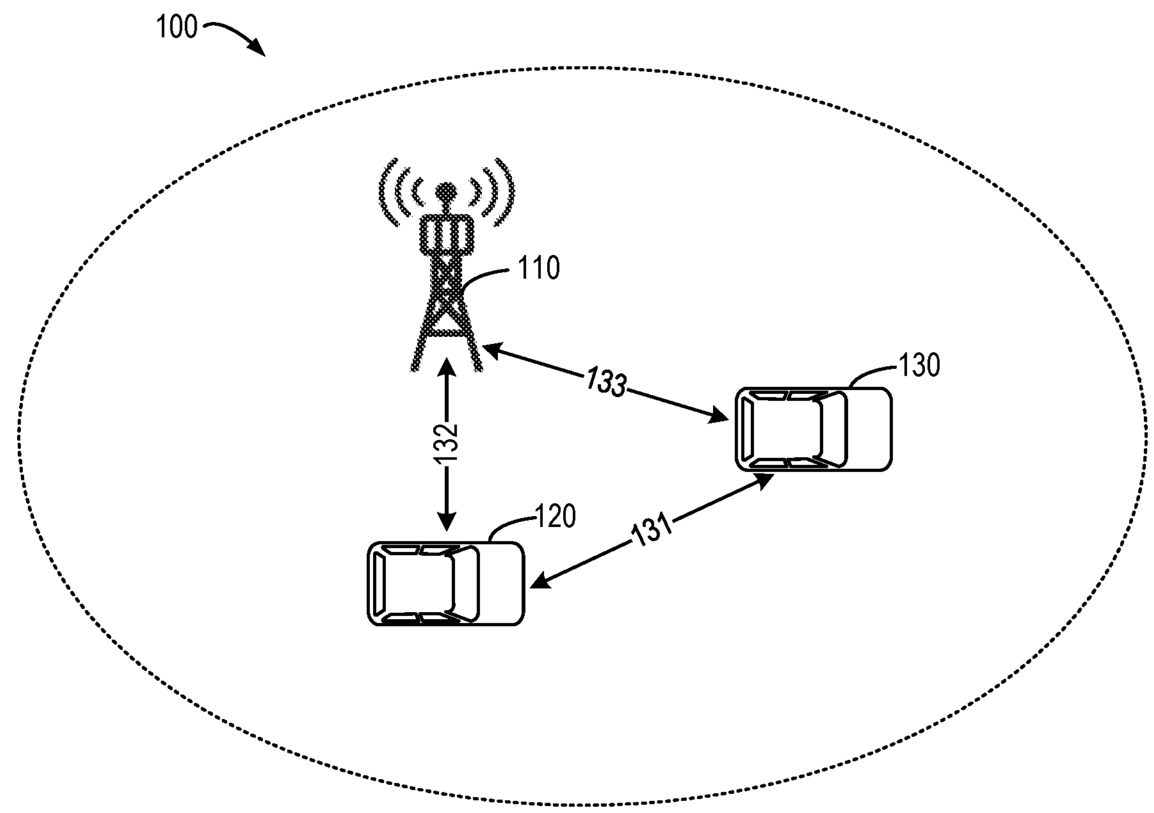
FIG. 1 illustrates an example communication network in which implementations of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, in D2D communications, two terminal devices can communicate with each other via a SL. In order to perform SL open-loop power control, a TX terminal device may transmit RSs for SL-RSRP measurement to a RX terminal device. The RX terminal device may measure SL-RSRP of the RSs received from the TX terminal device. For example, the RX terminal device may filter the measured SL-RSRP and report the filtered SL-RSRP to the TX terminal device. Then, the TX terminal device can derive a SL path loss based on the filtered SL-RSRP.

In 3GPP discussions, it has been proposed that the transmit power of the RSs will not be indicated to the RX terminal device. However, the actual transmit power of the TX terminal device may vary among SL-RSRP measurement occasions due to various reasons (such as, downlink based power control, power sharing between the sidelink and a simultaneous uplink or between different sidelinks, and so on). Without information about the transmit power of the TX terminal device, the filtered SL-RSRP derived at the RX terminal device will be inaccurate and thus the sidelink path loss estimated based on the filtered SL-RSRP will also be inaccurate.

Embodiments of the present disclosure provide a solution for sidelink power control, so as to solve the above problems and one or more of other potential problems. According to the solution, time windows for filtering SL-RSRP are aligned between the TX terminal device and the RX terminal device. Moreover, the transmit power to be used for estimating the SL path loss can be derived at the TX terminal device. As such, the SL path loss can be estimated more accurately and reasonably, and thus the power control based on the SL path loss can be performed more effectively.

FIG. 1 illustrates a schematic diagram of an example communication system 100 in which embodiments of the present disclosure can be implemented. As shown in FIG. 1, the communication system 100 may include a network device 110 and terminal devices 120 and 130. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

In some embodiments, a terminal device (such as, the terminal device 120 or 130 may be connected with a first network device and a second network device (not shown in FIG. 1). One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is eNB and the second RAT device is gNB. Information related with different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related with configuration for the terminal device configured by the second network device may be transmitted from the second network device via the first network device. Information related with reconfiguration for the terminal device configured by the second network device may be transmitted to the terminal device from the second network device directly or via the first network device.

As shown in FIG. 1, the network device 110 may communicate with the terminal devices 120 and 130 via channels (such as, wireless communication channels) 132 and 133, respectively. The terminal devices 120 and 130 are shown in FIG. 1 as vehicles which enable D2D communications (such as, V2X communications). It is to be understood that embodiments of the present disclosure are also applicable to other terminal devices than vehicles, such as mobile phones, sensors and so on. In some embodiments, the terminal device 120 may communicate with the terminal device 130 via a sidelink 131. In some embodiments, the sidelink may be half-duplex or full-duplex. For example, the terminal device 120 can transmit information to the terminal device 130 via the sidelink 131. The terminal device 130 can likewise transmit information to the terminal device 120 via the sidelink 131.

In the transmission from the terminal device 120 to the terminal device 130 via the sidelink 131, the terminal device 120 may act as a TX device, while the terminal device 130 acting as a RX device. In the transmission from the terminal device 130 to the terminal device 120 via the sidelink 131, the terminal device 130 may act as a TX device, while the terminal device 120 may act as a RX device. In the following, some embodiments will be described with reference to the terminal device 120 as an example of a TX device and with reference to the terminal device 130 as an example of a RX device. In the following, the terminal device 120 may also be referred to as the "TX device 120", "TX terminal device 120" or "first terminal device", and the terminal device 130 may also be referred to as the "RX device 130", "RX terminal device 130" or "second terminal device". It is to be understood that this is merely for the purpose of discussion, without suggesting any limitations to the scope of the present disclosure.

The communications in the communication system 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
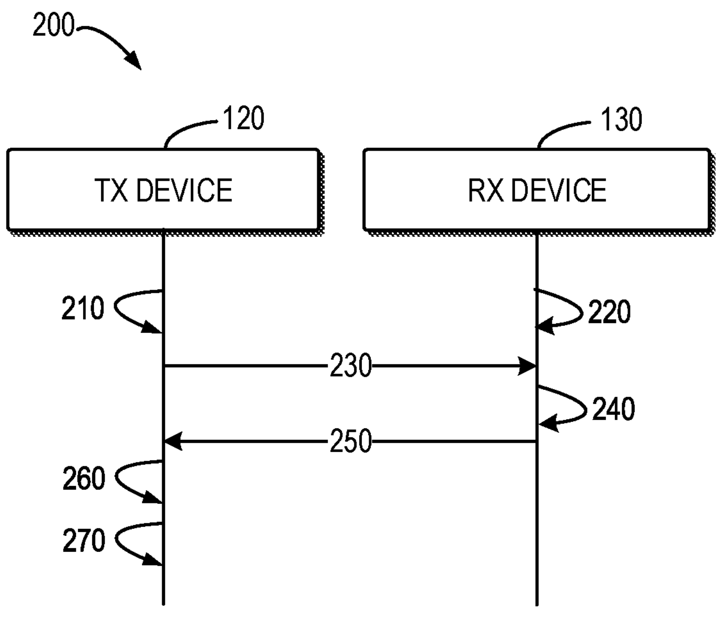
FIG. 2 illustrates an example signaling chart showing an example process for SL power control in accordance with some embodiments of the present disclosure.

FIG. 2 illustrates an example signaling chart showing an example process 200 for SL power control in accordance with some embodiments of the present disclosure. As shown in FIG. 2, the process 200 may involve the TX device 120 and the RX device 130 as shown in FIG. 1. It is to be understood that the process 200 may include additional acts not shown and/or may omit some acts as shown, and the scope of the present disclosure is not limited in this regard.

As shown in FIG. 2, the TX device 120 determines 210 a time window during which the RX device 130 is to filter SL-RSRP of SL transmissions received from the TX device 120. Likewise, the RX device 130 may also determine 220 the time window during which the RX device 130 is to filter SL-RSRP of SL transmissions received from the TX device 120. In the following, the time window may also be referred to as a "filter window" or "SL-RSRP filter window".

In some embodiments, the TX device 120 may determine a start of the time window based on a change in transmit power of two adjacent SL transmissions, where the time window may end at a start of a following time window.

In some embodiments, the TX device 120 may determine transmit power (also referred to as "first transmit power") for a current SL transmission (also referred to as "first SL transmission"). The TX device 120 may also determine transmit power (also referred to as "second transmit power") used for a previous SL transmission (also referred to as "second SL transmission"). In response to a difference between the first transmit power and the second transmit power exceeding a threshold, the TX device 120 may determine a start of the time window based on a time when the first SL transmission occurs.

Alternatively, in some embodiments, the TX device 120 may apply first SL path loss to control the transmit power of the first SL transmission, where the first SL path loss may be different from second SL path loss applied to power control of the previous SL transmission (that is, the second SL transmission). In this event, the TX device 120 may determine a start of the time window based on a time when the first SL transmission occurs.

Figure 3:
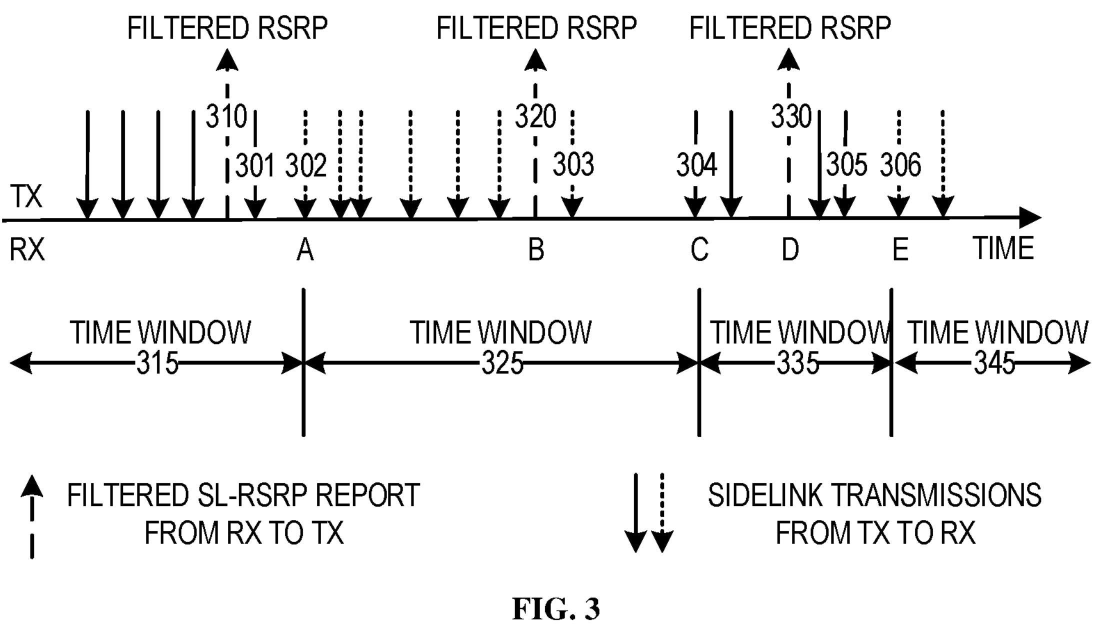
FIG. 3 illustrates examples of some embodiments of the present disclosure.

FIG. 3 illustrates examples of such embodiments. For example, as shown in FIG. 3, a difference between transmit power of a SL transmission 301 and transmit power of a SL transmission 302 may exceed the threshold, or different SL path losses may be applied to respectively control transmit power for the SL transmissions 301 and 302. In this event, a new filter window 325 may start at Time A, while a previous filter window 315 may end at Time A. Likewise, a difference between transmit power of a SL transmission 303 and transmit power of a SL transmission 304 may exceed the threshold, or different SL path losses may be applied to respectively control transmit power for the SL transmissions 303 and 304. In this event, a new filter window 335 may start at Time C, while the previous filter window 325 may end at Time C. A difference between transmit power of a SL transmission 305 and transmit power of a SL transmission 306 may exceed the threshold, or different SL path losses may be applied to respectively control transmit power for the SL transmissions 305 and 306. In this event, a new filter window 345 may start at Time E, while the previous filter window 335 may end at Time E.

In some embodiments, the TX device 120 may transmit an indication of the start of the time window to the RX device 130, such that the RX device 130 can determine the start of the time window based on the indication.

In some embodiments, preferably, a flag may be conveyed in PSCCH. The TX device 120 may toggle the flag in response to a different SL path loss (or a different filtered SL-RSRP) being used for power control of the current SL transmission compared with the previous SL transmission, or in response to a difference between transmit power of the current SL transmission and transmit power of the previous SL transmission exceeding the threshold. For example, in FIG. 3, the flag in a SL transmission (such as, the SL transmission 301) before Time A may be '0'. The flag in the SL transmission 302 at Time A, or the flag in each SL transmission (such as, the SL transmission 303) after Time A and before Time C may be '1'. The flag in the SL transmission 304 at Time C, or the flag in each SL transmission (such as, the SL transmission 305) after Time C and before Time E may be '0'. As such, the RX device 130 can determine the start of a new time window based on a time when the flag in PSCCH is toggled.

Alternatively, in some embodiments, a flag may be conveyed in PSCCH. For example, the TX device 120 may set the flag to be '1' if a different SL path loss (or a different filtered SL-RSRP) is used for power control of the current SL transmission compared with the previous SL transmission, or if a difference between transmit power of the current SL transmission and transmit power of the last SL transmission exceeds the threshold. Otherwise, the TX device 120 may set the flag to be '0'. For example, in FIG. 3, the flag in the SL transmission 302 at Time A, the flag in the SL transmission 304 at Time C, and the flag in the SL transmission 306 at Time E may be '1'; while flags in other SL transmissions may be '0'. As such, the RX device 130 can determine the start of a new time window based on a time when the flag in PSCCH is '1'.

In some embodiments, the TX device 120 may be configured with information about a time window. For example, the network device 110 may configure the information about the time window to the TX device 120 via higher layer signaling, or the information about the time window may be pre-configured at the TX device 120. In some embodiments, the information about the time window may indicate a start and/or an end of the time window. As such, the TX device 120 may determine the start and/or the end of the time window based on the information. In some embodiments, in response to determining that a difference between transmit power of the current SL transmission and transmit power of the last SL transmission exceeds a threshold, the TX device 120 may adjust the start of the time window. Moreover, the TX device 120 may further transmit an indication (such as, via PSCCH) to the RX device 130 to indicate that the start of the time window should be adjusted. Alternatively, in some embodiments, the information about the time window may indicate a time for receiving the filtered SL-RSRP from the RX device 130 during the time window and a time offset between the time and the start of the time window. As such, the TX device 120 may determine the start of the time window based on the time for receiving the filtered SL-RSRP during the time window and the time offset. The time offset may be related to the capability of the TX device 120. For example, different time windows can be associated with a same time offset or different time offsets.

In some embodiments, the RX device 130 may also be configured with the information about the time window. For example, the network device 110 or the TX device 120 may configure the information about the time window to the RX device 130 via higher layer signaling, or the information about the time window may be pre-configured at the RX device 130. In some embodiments, the information about the time window may indicate the start and/or the end of the time window. The RX device 130 may determine the start and/or the end of the time window based on the information. In some embodiments, the TX device 120 may transmit an indication (such as, via PSCCH) to the RX device 130 to indicate that the start of the time window should be adjusted, for example, when a change in transmit power of two adjacent SL transmissions exceeds a threshold. In response to receiving the indication from the TX device 120, the RX device 130 may adjust the start of the time window accordingly. Alternatively, in some embodiments, the information about the time window may indicate a time for transmitting the filtered SL-RSRP to the TX device 120 during the time window and a time offset between the time and the start of the time window. The RX device 130 may determine the start of the time window based on the time for transmitting the filtered SL-RSRP during the time window and the time offset. The time offset may be related to the capability of the TX device 120. For example, different time windows can be associated with a same time offset or different time offsets.

Figure 4:
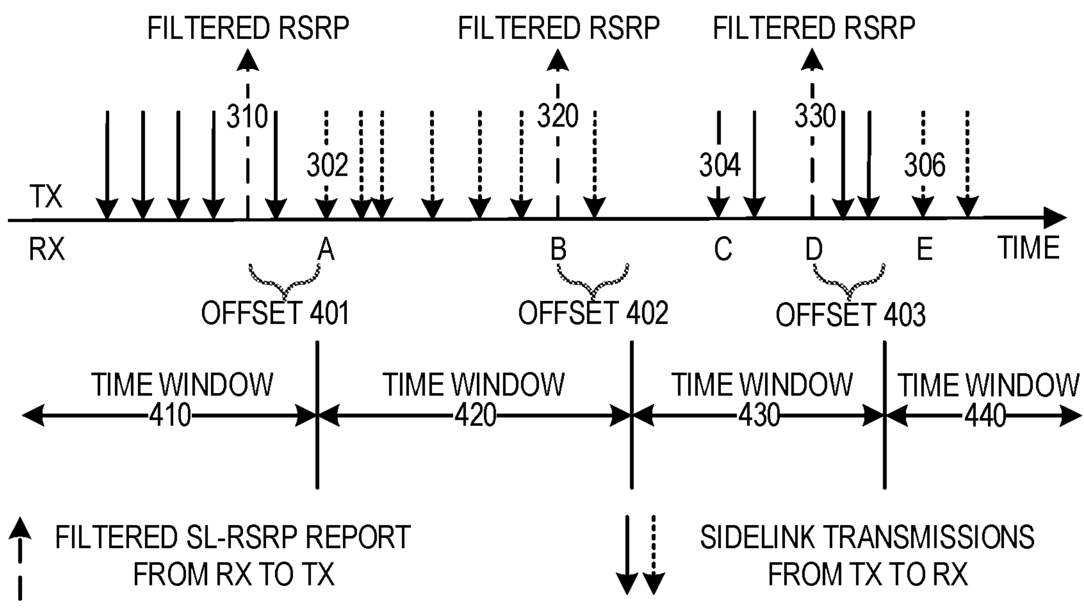
FIG. 4 illustrates examples of some embodiments of the present disclosure.

FIG. 4 illustrates examples of such embodiments. As shown in FIG. 4, a corresponding time for reporting each filtered SL-RSRP and a time offset relative to the corresponding time are configured. For example, regarding a time window 420, the start of the time window 420 can be determined based on the time of the filtered SL-RSRP report 310 and a time offset 401. Regarding a time window 430, the start of the time window 430 can be determined based on the time of the filtered SL-RSRP report 320 and a time offset 402. Regarding a time window 440, the start of the time window 440 can be determined based on the time of the filtered SL-RSRP report 330 and a time offset 403. The time offsets 401, 402 and 403 associated with different time windows can be the same or different from each other. In the example as shown in FIG. 4, each time window ends when a following time window starts.

With reference back to FIG. 2, the TX device 120 transmits 230, to the RX device 130, RSs for SL-RSRP measurement via Physical Sidelink Control Channel (PSCCH) and/or Physical Sidelink Shared Channel (PSSCH). In some embodiments, the TX device 120 may transmit the RSs to the RX device 130 via one of unicast, groupcast and broadcast.

In response to receiving the SL transmissions (such as, PSCCH and/or PSSCH), the RX device 130 measures 240 SL-RSRP of the SL transmissions and filters 240 the SL-RSRP during the time window.

In some embodiments, the RX device 130 may utilize a Layer-1 filter or a Layer-3 filter to filter the measured SL-RSRP during the time window. The RX device 130 may reset/restart the filter at the start of the time window, so as to initiate the filtering of the SL-RSRSP during the time window. For example, in 3GPP specification TS 38.331, a Layer-3 filter is defined by the following formula:

$$F_n=(1-a)*F_{n-1}+\alpha*M_n \quad (1)$$

where $M_n$ is the latest received measurement result from the physical layer. $F_n$ is the updated filtered measurement result, that is used for evaluation of reporting criteria or for measurement reporting. $F_{n-1}$ is the old filtered measurement result, where $F_0$ is set to $M_1$ when the first measurement result from the physical layer is received. $a=½^{(ki/4)}$, where $k_i$ is a configured filter coefficient. In some embodiments, the RX device 130 may utilize the filter as defined by the above formula (1) for filtering the SL-RSRP during the time window. Alternatively, in other embodiments, a different filter can be used by the RX device 130. The scope of the present disclosure will not be limited in this aspect.

In some embodiments, preferably, the RX device 130 is mandatory to measure SL-RSRP of all the received SL transmissions during the time window. For example, the RX device 130 is mandatory to measure SL-RSRP of all the received SL transmissions before reporting the filtered SL-RSRP to the TX device 120 during the time window. For example, with respect to the time window 325 as shown in FIG. 3, the RX device 130 is mandatory to measure SL-RSRP of all the received SL transmissions from Time A to Time B (including the SL transmission 302).

With reference back to FIG. 2, the RX device 130 transmits 250 the filtered SL-RSRP to the TX device 120. Accordingly, the TX device 120 receives 250 the filtered SL-RSRP from the RX device 130.

In some embodiments, the RX device 130 may be configured with a report period for reporting the filtered SL-RSRP. For example, the network device 110 or the TX device 120 may configure the report period to the RX device 130 via higher layer signaling. Alternatively, in some embodiment, the RX device 130 may determine the report period for reporting the filtered SL-RSRP. For example, the report period can be determined based on at least one of the following: an absolute speed of the RX device 130; a relative speed between the TX device 120 and the RX device 130; a difference between the power given by open-loop power control (OLPC) based on a downlink path loss and that given by OLPC based on a SL path loss; and the capability of the RX device 130. In some embodiments, the RX device 130 may determine the time for transmitting the filtered SL-RSRP to the TX device 120 based on the report period, such that an interval between the determined time and the time for reporting a previous filtered SL-RSRP exceeds the report period and the RX device 130 has a SL grant at the determined time. In some embodiments, the TX device 120 or the network device 110 may determine the time for receiving the filtered SL-RSRP from the RX device 130 based on the report period in a same way as the RX device 130. For example, the TX device 120 or the network device 110 may determine the time for receiving the filtered SL-RSRP from the RX device 130 based on the report period, such that an interval between the determined time and the time for receiving a previous filtered SL-RSRP exceeds the report period and the RX device 130 has a SL grant at the determined time.

Alternatively, in some embodiments, the RX device 130 may determine the time for transmitting the filtered SL-RSRP to the TX device 120 in response to occurrence of an event. For example, the RX device 130 may determine the time for transmitting the filtered SL-RSRP to the TX device 120 based on a determination that a difference between the filtered SL-RSRP and a previous filtered SL-RSRP which has been transmitted to the first terminal device exceeds a RSRP threshold. For example, the RSRP threshold may be configured by the TX device 120 or the network device 110. For another example, the RSRP threshold may be determined by the RX device 130.

In some embodiments, the RX device 130 may transmit, to the TX device 120, an indication of the time for reporting the filtered SL-RSRP. For example, the indication of the time may be transmitted to the TX device 120 via MAC CE along with the filtered SL-RSRP report. For example, the indication may be transmitted to the TX device 120 if the report period is determined by the RX device 130 or if the reporting of the filtered SL-RSRP is triggered by an event. As such, the TX device 120 can determine the time for receiving the filtered SL-RSRP from the RX device 130 based on the indication.

In some embodiments, a report period and a time offset for reporting the filtered SL-RSRP may be configured at the TX device 120 and the RX device 130 by the network device 110. In some embodiments, the report period and the time offset for reporting the filtered SL-RSRP may be configured at the TX device 120 by the network device 110 or pre-configured at the TX device 120. The TX device 120 may configure the report period and the time offset to the RX device 130 via higher layer signaling. In some embodiments, the RX device 130 may determine the time for transmitting the filtered SL-RSRP to the TX device 120 based on the report period and the time offset. Likewise, the TX device 120 may determine the time for receiving the filtered SL-RSRP from the RX device 130 based on the report period and the time offset. In some embodiments, for the case of groupcast (that is, the TX device 120 may transmit PSCCH and/or PSSCH to a group of RX devices), a same report period but different offsets can be configured to the RX devices in the group. For example, the offsets for different RX devices in the group can be determined from nested values, such as, 0, 1, 2, 4, 8, 16 . . . ms/slots, so as to reduce resource usage and the duplex issue.

In some embodiments, the reporting of the filtered SL-RSRP may be disabled in response to OLPC based on a SL path loss being disabled. In some embodiments, the reporting of the filtered SL-RSRP may be disabled by the TX device 120 via higher layer signaling in response to the power given by OLPC based on a downlink path loss is below the power given by OLPC based on a SL path loss. Alternatively, in some embodiments, the reporting of the filtered SL-RSRP may be disabled by the TX device 120 via higher layer signaling in response to the power given by OLPC based on a downlink path loss is below the power given by OLPC based on a SL path loss and a difference between the two exceeds a threshold. For example, the threshold can be configured by the network device 110 or the TX device 120.

With reference back to FIG. 2, in response to receiving the filtered SL-RSRP from the RX device 130, the TX device 120 estimates 260, based on the filtered SL-RSRP, a path loss of the SL 131.

In some embodiments, the TX device 120 may estimate the SL path loss as following:

$$\text{Pathloss}=\text{Power\_}tx-\text{Filtered\_}SL\text{\_RSRP} \tag{2}$$

wherein Pathloss represents the estimated SL path loss, Power_tx represents a transmit power to be used for estimation the SL path loss, and Filtered_SL_RSRP represents the filtered SL-RSRP received from the RX device 130.

In some embodiments, the transmit power Power_tx to be used for estimating the SL path loss may be determined based on one of the following: an average value of actual transmit power of sidelink transmissions between the start of the time window and the reception of the filtered SL-RSRP; actual transmit power of an initial sidelink transmission after the start of the time window; or actual transmit power of a last sidelink transmission before the reception of the filtered SL-RSRP.

In some embodiments, the TX device 120 may determine the transmit power Power_tx by filtering actual transmit power of SL transmissions between the start of the time window and the reception of the filtered SL-RSRP, except the SL transmission for which discontinuous transmission (DTX) is identified. For example, the Layer-3 filter as defined by the above formula (1) can be utilized by the TX device 120 to filter actual transmit power of the SL transmissions, where actual transmit power of each SL transmission may act as $M_n$, instead of the latest received measurement result from the physical layer. In the example as shown in FIG. 3, for example, the transmit power Power_tx to be used for estimating the SL path loss during the time window 325 may be determined as a filtered result of ($P_1$, $P_2$, $P_3$ . . . $P_n$) according to the above formula (1), where $P_i$ ($1 \le i \le n$) represent the actual transmit power of each SL transmission from Time A to Time B, except the SL transmissions for which DTX is identified.

Alternatively, in some embodiments, in order to determine the transmit power Power_tx to be used for estimating the SL path loss during the time window, the TX device 120 may determine, for each of SL transmissions (except the SL transmissions for which DTX is identified) between the start of the time window and the reception of the filtered SL-RSRP, a difference between the actual transmit power of the SL transmission and a reference transmit power P0. The TX device 120 may filtering respective differences determined for the SL transmissions and determine, based on the reference transmit power P0 and a result of the filtering, the transmit power Power_tx to be used for estimating the SL path loss. For example, the reference transmit power P0 may be defined as a constant value at least during the time window. For example, the reference transmit power P0 may be configured via higher layer signaling or determined based on the implementation of the TX device 120. In some cases, the reference transmit power P0 may be 0.

In some embodiments, the transmit power Power_tx to be used for estimating the SL path loss during the time window can be determined as following:

$$\text{Power\_}tx=\text{Power\_filtered}-P0 \tag{3}$$

where Power_filtered represents a filtered result of ($P_1$-P0, $P_2$-P0, $P_3$-P0 . . . $P_n$-P0) according to the above formula (1), where $P_i(1 \le i \le n)$ represent the actual transmit power of each SL transmission during the time window (such as, from the start of the time window to the reception of the filtered SL-RSRP), except the SL transmissions for which DTX is identified. In this event, the TX device 120 may estimate the SL path loss based on the above formula (2).

Alternatively, in some embodiments, the transmit power Power_tx to be used for estimating the SL path loss during the time window can be determined as following:

$$\text{Power\_}tx = P0 - \text{Power\_filtered} \quad (4)$$

where Power_filtered represents a filtered result of ($P0-P_1$, $P0-P_2$, $P0-P_3$ . . . $P0-P_n$) according to the above formula (1), where $P_i$ $(1 \le i \le n)$ represent the actual transmit power of each SL transmission during the time window (such as, from the start of the time window to the reception of the filtered SL-RSRP), except the SL transmissions for which DTX is identified. In this event, the TX device 120 may estimate the SL path loss as following:

$$\text{Pathloss} = \text{Filtered\_}SL\text{\_RSRP} - \text{Power\_}tx \quad (5)$$

As shown in FIG. 2, the TX device 120 applies 270 the estimated SL path loss to power control of at least one subsequent SL transmissions from the TX device 120 to the RX device 130 over the SL 130.

In some embodiments, the TX device 120 may be configured with timing information for applying the estimated SL path loss to OLPC of the at least one subsequent SL transmission. The TX device 120 may applying the estimated SL path loss to OLPC of the at least one subsequent SL transmission based on the timing information.

In some embodiments, the timing information may indicate a time offset between the reception of the filtered SL-RSRP and the applying of the estimated SL path loss. For example, the time offset may be related to the capability of the TX device 120 and/or a processing time. In this event, the TX device 120 may apply the estimated SL path loss to OLPC of the at least one subsequent SL transmission after the time offset subsequent to the reception of the filtered SL-RSRP.

Alternatively, in some embodiments, the timing information may indicate a time offset between the end of the time window and the applying of the estimated SL path loss. For example, the time offset may be related to the capability of the TX device 120 and/or a processing time. In this event, the TX device 120 may apply the estimated SL path loss to OLPC of the at least one subsequent SL transmission after the time offset subsequent to the end of the time window.

Figure 5:
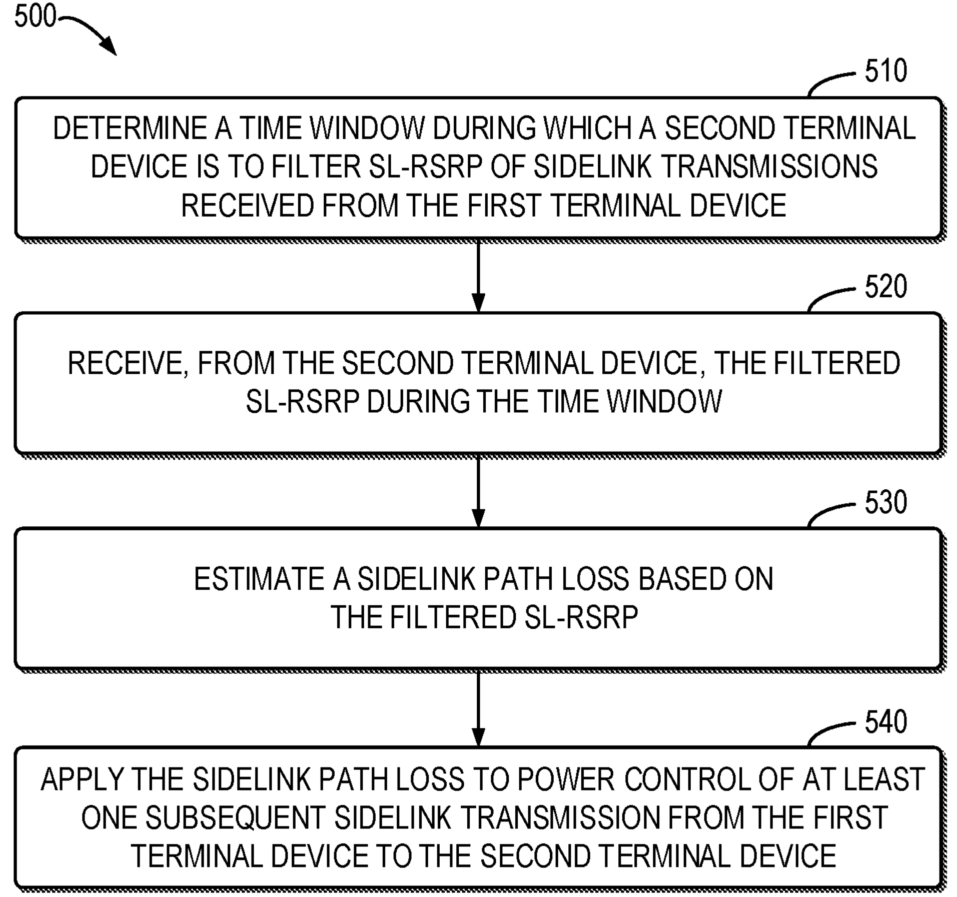
FIG. 5 illustrates a flowchart of an example method in accordance with some embodiments of the present disclosure.

FIG. 5 illustrates a flowchart of an example method 500 in accordance with some embodiments of the present disclosure. For example, the method 500 can be performed at the first terminal device 120 as shown in FIGS. 1-2. It is to be understood that the method 500 may include additional blocks not shown and/or may omit some blocks as shown, and the scope of the present disclosure is not limited in this regard.

At block 510, the first terminal device 120 determines a time window during which a second terminal device 130 is to filter SL-RSRP of sidelink transmissions received from the first terminal device 120.

In some embodiments, determining the time window comprises: determining first transmit power of a first sidelink transmission from the first terminal device to the second terminal device; determining second transmit power of a second sidelink transmission from the first terminal device to the second terminal device occurring prior to the first sidelink transmission; and in response to a difference between the first transmit power and the second transmit power exceeding a threshold, determining a start of the time window based on a time when the first sidelink transmission occurs, wherein the time window ends at a start of a following time window.

In some embodiments, determining the time window comprises: determining first sidelink path loss applied to power control of a first sidelink transmission from the first terminal device to the second terminal device; determining second sidelink path loss applied to power control of a second sidelink transmission from the first terminal device to the second terminal device occurring prior to the first sidelink transmission; and in response to the first sidelink path loss being different from the second sidelink path loss, determining a start of the time window based on a time when the first sidelink transmission occurs, wherein the time window ends at a start of a following time window.

In some embodiments, the method 500 further comprises: transmitting, from the first terminal device, an indication of the start of the time window to the second terminal device via the first sidelink transmission.

In some embodiments, determining the time window comprises: in response to the first terminal device being configured with information about the time window, determining the time window based on the information.

In some embodiments, the information about the time window indicates a start and/or an end of the time window, and determining the time window based on the information comprises: determining the start and/or the end of the time window based on the information.

In some embodiments, the information about the time window indicates a time for receiving the filtered SL-RSRP during the time window and a time offset between the time and a start of the time window, and determining the time window based on the information comprises: determining the start of the time window based on the time and the time offset, wherein the time window ends at a start of a following time window.

In some embodiments, the method 500 further comprises: transmitting, from the first terminal device, the information about the time window to the second terminal device.

At block 520, the first terminal device 120 receives, from the second terminal device 130, the filtered SL-RSRP during the time window.

In some embodiments, receiving the filtered SL-RSRP comprises: determining a time for receiving the filtered SL-RSRP during the time window; and receiving the filtered SL-RSRP at the time.

In some embodiments, determining the time comprises: in response to the first terminal device being configured with a period for receiving the filtered SL-RSRP from the second terminal device, determining the time based on the period, such that an interval between the determined time and a time for receiving a previous filtered SL-RSRP exceeds the period and the second terminal device has a sidelink grant at the determined time.

In some embodiments, determining the time comprises: in response to the first terminal device being configured with a period and a time offset for receiving the filtered SL-RSRP from the second terminal device, determining the time based on the period and the time offset.

In some embodiments, determining the time comprises: receiving, from the second terminal device, an indication of the time; and determining the time based on the indication.

At block 530, the first terminal device 120 estimates a sidelink path loss based on the filtered SL-RSRP.

In some embodiments, estimating the sidelink path loss comprises: determining transmit power to be used for estimating the sidelink path loss; and estimating the sidelink path loss based on the transmit power and the filtered SL-RSRP.

In some embodiments, the transmit power to be used for estimating the sidelink path loss is determined based on one of the following: an average value of actual transmit power of sidelink transmissions between a start of the time window and the reception of the filtered SL-RSRP; actual transmit power of an initial sidelink transmission after the start of the time window; or actual transmit power of a last sidelink transmission before the reception of the filtered SL-RSRP.

In some embodiments, determining the transmit power to be used for estimating the sidelink path loss comprises: filtering actual transmit power of sidelink transmissions between a start of the time window and the reception of the filtered SL-RSRP; and determining, based on a result of the filtering, the transmit power to be used for estimating the sidelink path loss.

In some embodiments, determining the transmit power to be used for estimating the sidelink path loss comprises: determining, for each of sidelink transmissions between a start of the time window and the reception of the filtered SL-RSRP, a difference between actual transmit power of the sidelink transmission and a reference transmit power; filtering respective differences determined for the sidelink transmissions between the start of the time window and the reception of the filtered SL-RSRP; and determining, based on the reference transmit power and a result of the filtering, the transmit power to be used for estimating the sidelink path loss.

At block 540, the first terminal device 120 applies the sidelink path loss to power control of at least one subsequent sidelink transmission from the first terminal device 120 to the second terminal device 130.

In some embodiments, applying the sidelink path loss to power control of the at least one subsequent sidelink transmission comprises: in response to the first terminal device being configured with timing information for applying the sidelink path loss to power control of the at least one subsequent sidelink transmission, applying the sidelink path loss to power control of the at least one subsequent sidelink transmission based on the timing information.

Figure 6:
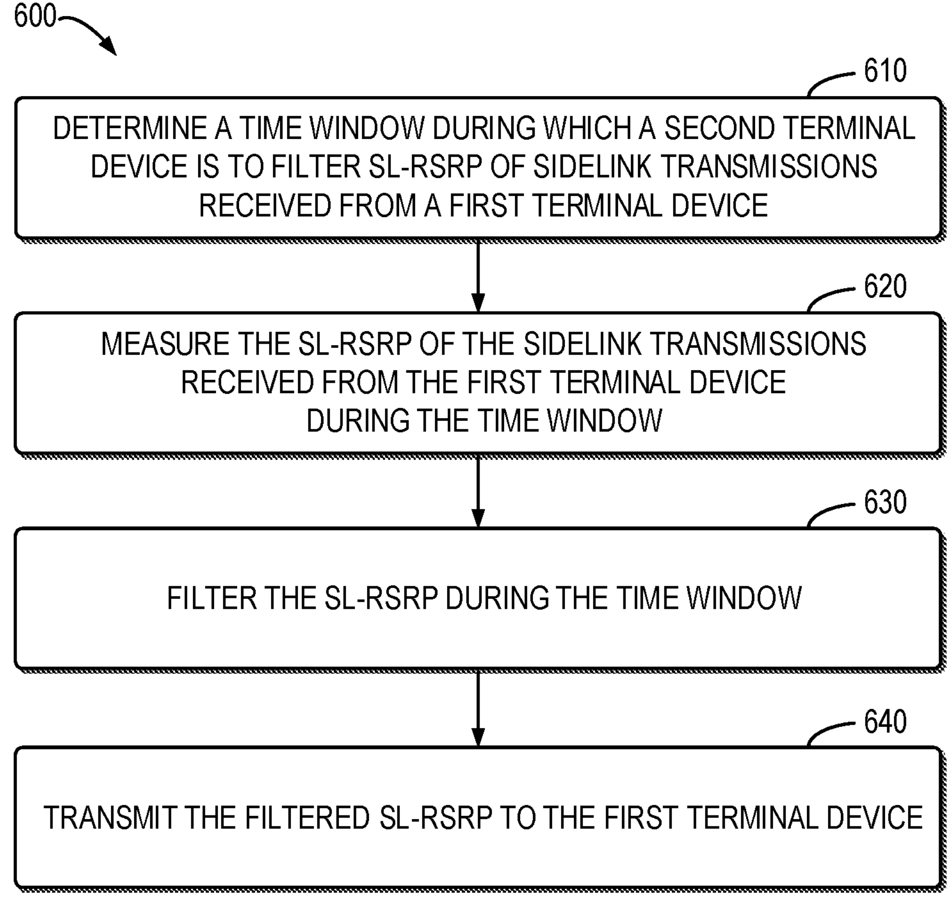
FIG. 6 illustrates a flowchart of an example method in accordance with some embodiments of the present disclosure.

FIG. 6 illustrates a flowchart of an example method 600 in accordance with some embodiments of the present disclosure. For example, the method 600 can be performed at the second terminal device 130 as shown in FIGS. 1-2. It is to be understood that the method 600 may include additional blocks not shown and/or may omit some blocks as shown, and the scope of the present disclosure is not limited in this regard.

At block 610, the second terminal device 130 determines a time window during which the second terminal device 130 is to filter SL-RSRP of sidelink transmissions received from a first terminal device 120.

In some embodiments, determining the time window comprises: receiving, from the first terminal device, an indication of the start of the time window; and determining a start of the time window based on the indication, wherein the time window ends at a start of a following time window.

In some embodiments, determining the time window comprises: in response to the second terminal device being configured with information about the time window, determining the time window based on the information.

In some embodiments, the information about the time window indicates a start and/or an end of the time window, and determining the time window based on the information comprises: determining the start and/or the end of the time window based on the information.

In some embodiments, the information about the time window indicates a time for transmitting the filtered SL-RSRP during the time window and a time offset between the time and a start of the time window, and determining the time window based on the information comprises: determining the start of the time window based on the time and the time offset, wherein the time window ends at a start of a following time window.

At block 620, the second terminal device 130 measures the SL-RSRP of the sidelink transmissions received from the first terminal device 120 during the time window.

At block 630, the second terminal device 130 filters the SL-RSRP during the time window.

In some embodiments, filtering the SL-RSRP during the time window comprises: resetting a filter for filtering the SL-RSRP at a start of the time window, to initiate the filtering of the SL-RSRP for the time window.

At block 640, the second terminal device 130 transmits the filtered SL-RSRP to the first terminal device 120, such that the first terminal device 120 performs power control of at least one subsequent sidelink transmission from the first terminal device 120 to the second terminal device 130 based on the filtered SL-RSRP.

In some embodiments, transmitting the filtered SL-RSRP comprises: determining a time for transmitting the filtered SL-RSRP to the first terminal device during the time window; and transmitting the filtered SL-RSRP to the first terminal device at the time.

In some embodiments, determining the time comprises: in response to the second terminal device being configured with a period for transmitting the filtered SL-RSRP to the first terminal device, determining the time based on the period, such that an interval between the determined time and a time for transmitting a previous filtered SL-RSRP exceeds the period and the second terminal device has a sidelink grant at the determined time.

In some embodiments, determining the time comprises: in response to the second terminal device being configured with a period and a time offset for transmitting the filtered SL-RSRP to the first terminal device, determining the time based on the period and the time offset.

In some embodiments, determining the time comprises: determining the time based on a determination that a difference between the filtered SL-RSRP and a previous filtered SL-RSRP which has been transmitted to the first terminal device exceeds a threshold.

In some embodiments, the method 600 further comprises: prior to transmitting the filtered SL-RSRP to the first terminal device, transmitting an indication of the time to the first terminal device.

Figure 7:
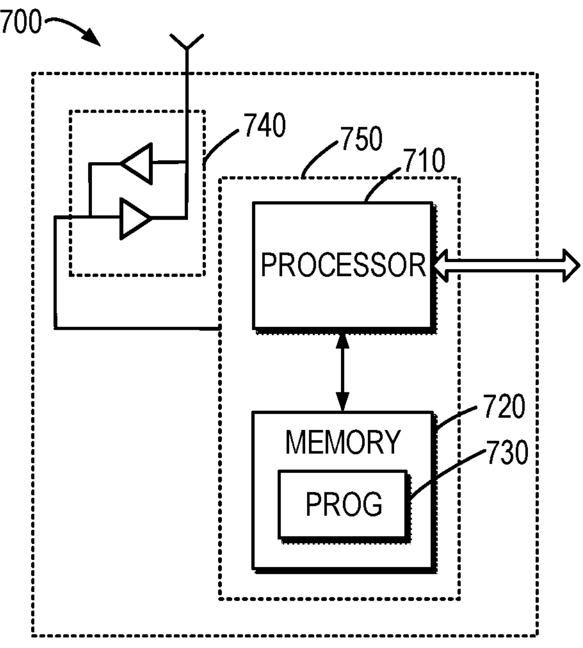
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the terminal device 120 or 130 as shown in FIG. 1. Accordingly, the device 700 can be implemented at or as at least a part of the terminal device 120 or 130.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a first terminal device, the method comprising:

receiving, from a second terminal device, a higher layer filtered Reference Signal Received Power (RSRP)

obtained using a filter configuration based on a filter coefficient for sidelink; and determining a path loss by subtracting the higher layer filtered RSRP from a value based on a transmit power of Physical Sidelink Shared Channel (PSSCH) transmissions, the transmit power being filtered, using the filter configuration based on the filter coefficient for sidelink, across a plurality of PSSCH transmission occasions.

2. The method of claim 1, the filtered RSRP is reported with a predetermined period by the second terminal device.

3. The method of claim 2, the predetermined period is configured via higher layer signaling.

4. A first terminal device comprising:

a transceiver configured to receive, from a second terminal device, a higher layer filtered Reference Signal Received Power (RSRP) obtained using a filter configuration based on a filter coefficient for sidelink; and a processor configured to determine a path loss by subtracting the higher layer filtered RSRP from a value based on a transmit power of Physical Sidelink Shared Channel (PSSCH) transmissions, the transmit power being filtered, using the filter configuration based on the filter coefficient for sidelink, across a plurality of PSSCH transmission occasions.

5. The first device of claim 4, the filtered RSRP is reported with a predetermined period by the second terminal device.

6. The first device of claim 4, the predetermined period is configured via higher layer signaling.

* * * * *